United States Patent
Sato

(10) Patent No.: US 12,547,050 B2
(45) Date of Patent: Feb. 10, 2026

(54) APERTURE STOP APPARATUS AND OPTICAL APPARATUS

(71) Applicant: CANON KABUSHIKI KAISHA, Tokyo (JP)

(72) Inventor: Katsuhiko Sato, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 18/631,563

(22) Filed: Apr. 10, 2024

(65) Prior Publication Data
US 2024/0345454 A1    Oct. 17, 2024

(30) Foreign Application Priority Data

Apr. 17, 2023 (JP) .................................. 2023-067269
Apr. 17, 2023 (JP) .................................. 2023-067284

(51) Int. Cl.
*G03B 9/06* (2021.01)
*G03B 35/10* (2021.01)

(52) U.S. Cl.
CPC ............... *G03B 9/06* (2013.01); *G03B 35/10* (2013.01)

(58) Field of Classification Search
CPC ...................................................... G03B 35/10
See application file for complete search history.

(56) References Cited

U.S. PATENT DOCUMENTS

| | | | | |
|---|---|---|---|---|
| 1,512,785 A | * | 10/1924 | Mittasch | G03B 9/08 396/505 |
| 2,527,106 A | * | 10/1950 | Smith | G03B 17/02 116/213 |
| 2,677,999 A | * | 5/1954 | Smith | G03B 17/20 396/458 |
| 2,837,986 A | * | 6/1958 | Perlin | G03B 35/10 396/495 |
| 2,869,446 A | * | 1/1959 | Franceschini | G03B 9/08 396/326 |
| 2,922,349 A | * | 1/1960 | Rochwite | G03B 35/10 396/326 |
| 3,774,512 A | * | 11/1973 | Seiden | G03B 35/10 396/510 |

FOREIGN PATENT DOCUMENTS

| JP | S6360116 U | * | 4/1988 |
|---|---|---|---|
| JP | H08304874 A | * | 11/1996 |
| JP | 2014119615 A | | 6/2014 |
| JP | 2021056394 A | | 4/2021 |

* cited by examiner

*Primary Examiner* — Leon W Rhodes, Jr.
(74) *Attorney, Agent, or Firm* — ROSSI, KIMMS & McDOWELL LLP

(57) ABSTRACT

An aperture stop apparatus configured to control a light amount in each of two optical systems arranged in parallel includes a drive gear, a single driving source configured to drive the drive gear, a base member, two aperture stops as iris stops each having three or more blade members, and two rotating members each including a gear portion engaged with the drive gear. Each aperture stop is operated as a corresponding one of the rotating members rotates. A rotation of a drive gear driven by the driving source is transmitted to the two rotating members through the gear portions provided to the rotating members and engaged with the drive gear.

19 Claims, 6 Drawing Sheets

APERTURE STOP APPARATUS AND OPTICAL APPARATUS

BACKGROUND

Technical Field

One of the aspects of the embodiments relates to an aperture stop apparatus for two optical systems arranged in parallel.

Description of Related Art

An optical apparatus having two optical systems arranged in parallel for stereo imaging includes an aperture stop apparatus having an aperture stop that controls (adjusts) a light amount for each optical system. Each of Japanese Patent Laid-Open Nos. 2014-119615 and 2021-056394 discloses an aperture stop apparatus that drives two aperture stops using a single driving source. In Japanese Patent Laid-Open No. 2014-119615, a single driving source drives two aperture blades provided in common to two optical systems, via a driving arm. In Japanese Patent Laid-Open No. 2021-056394, a single driving source drives two aperture blades, each of which is provided for each of the two aperture stops, via a lever member.

Providing one or two aperture blades for each optical system as in the aperture stop apparatuses disclosed in Japanese Patent Laid-Open Nos. 2014-119615 and 2021-056394 has difficulty in creating an aperture shape in each aperture stop for an excellent image degradation (bokeh) shape in imaging.

SUMMARY

An aperture stop apparatus according to one aspect of the disclosure is configured to control a light amount in each of a first optical system and a second optical system arranged in parallel. The aperture stop apparatus includes a drove gear, a single driving source configured to drive the drive gear, a base member configured to hold the driving source and having a first opening corresponding to the first optical system and a second opening corresponding to the second optical system, a first aperture stop configured to form an aperture for light passing through the first opening, a second aperture stop configured to form an aperture for light passing through the second opening, a first rotating member rotatable around a center axis of the first opening relative to the base member and including a gear portion, and a second rotating member rotatable around a center axis of the second opening relative to the base member and including a gear portion. Each of the first aperture stop and the second aperture stop is an iris stop having three or more blade members. The first aperture stop is operated as the first rotating member rotates and the second aperture stop is operated as the second rotating member rotates. A rotation of the drive gear driven by the driving source is transmitted to the first rotating member and the second rotating member through the gear portions engaged with the drive gear. An optical apparatus having the above aperture stop apparatus also constitutes another aspect of the disclosure.

Further features of various embodiments of the disclosure will become apparent from the following description of embodiments with reference to the attached drawings.

DESCRIPTION OF THE EMBODIMENTS

Figure 1:
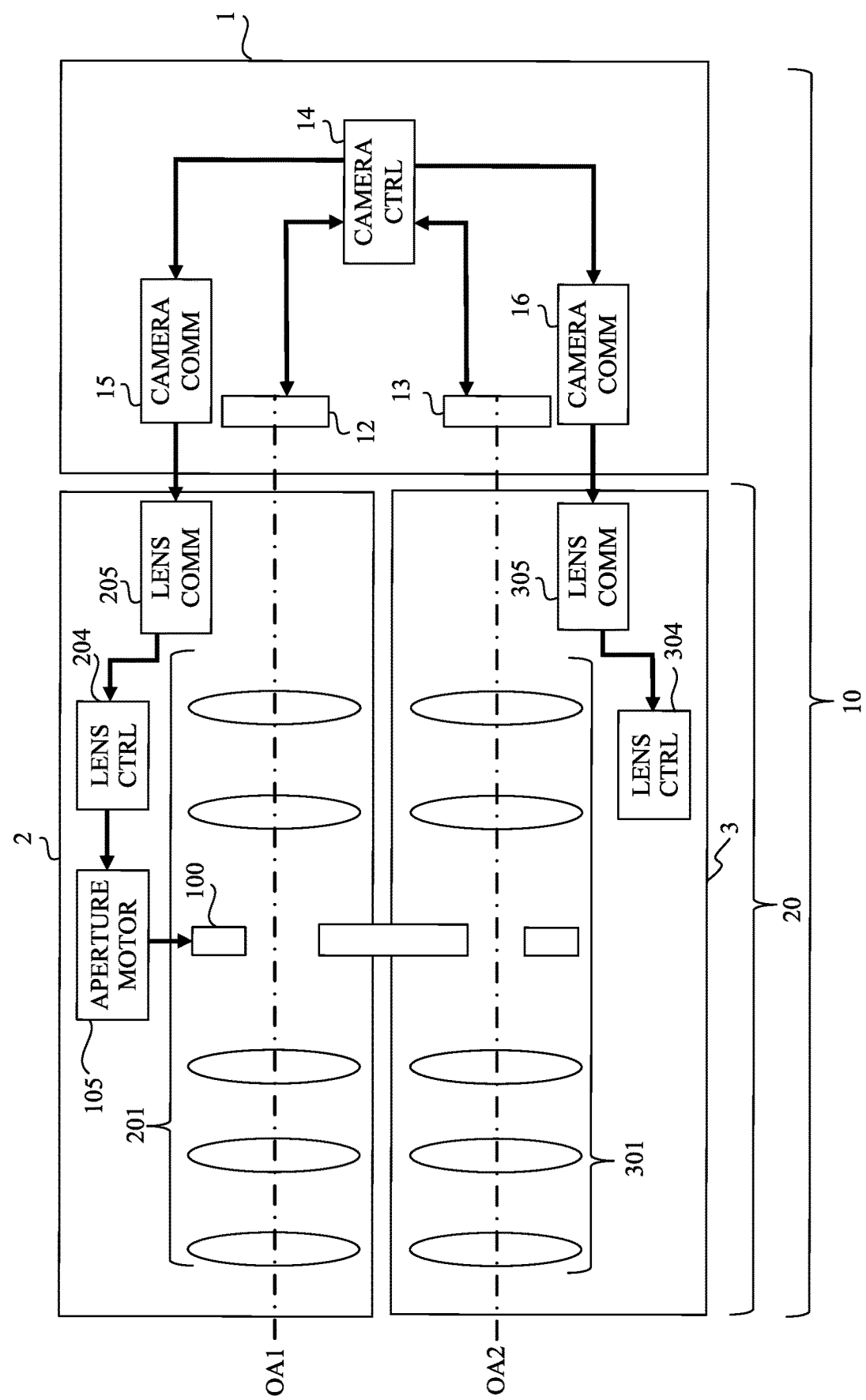
FIG. 1 is a block diagram illustrating the configuration of an image pickup apparatus according to Example 1.

Referring now to the accompanying drawings, a detailed description will be given of embodiments according to the disclosure. Corresponding elements in respective figures will be designated by the same reference numerals, and a duplicate description thereof will be omitted.

Example 1

FIG. 1 illustrates the configuration of an image pickup apparatus 10 as an optical apparatus having an aperture stop apparatus according to Example 1. The image pickup apparatus 10 includes a camera body 1 and a stereo optical unit 20 provided in the camera body 1. The stereo optical unit 20 includes a first optical unit 2 and a second optical unit 3. In this embodiment, the stereo optical unit 20 is integrally fixed to the camera body 1, but the stereo optical unit 20 may be an interchangeable lens (optical apparatus) attachable to and detachable from the camera body 1.

The first optical unit 2 includes a first optical system 201, a lens control unit (LENS CTRL) 204, and a lens communication unit (LENS COMM) 205. The second optical unit 3 includes a second optical system 301, a lens control unit (LENS CTRL) 304, and a lens communication unit (LENS COMM) 305. The first optical system 201 and the second optical system 301 have the same optical configuration and are arranged in parallel on the left and right so that their optical axes OA1 and OA2 are parallel to each other. In the following description, a direction in which the optical axes OA1 and OA2 extend will be referred to as an optical axis direction. The first optical system 201 and the second optical system 301 are each driven in the optical axis direction during zooming or focusing by a zoom motor or a focus motor as an unillustrated driving source. The first optical system 201 and the second optical system 301 may include one or more lenses, or may include optical elements other than lenses, such as a prism or a mirror. The first optical system 201 and the second optical system 301 also include a shift lens (image stabilizing lens) configured to moves in a direction orthogonal to the optical axes OA1 and OA2 for image stabilization according to shake of the image pickup apparatus 10 caused by camera shake or the like.

The stereo optical unit 20 further includes a single light amount control apparatus (aperture stop apparatus) 100 that is provided in common to the first optical system 201 and the second optical system 301. The light amount control apparatus 100 includes a first aperture stop provided for the first optical system 201, a second aperture stop provided for the second optical system 301, and an aperture motor 105 as a single driving source commonly provided to the first aperture stop and the second aperture stop. Driving the first and second aperture stops by the aperture motor 105 changes the aperture diameters formed by the first and second aperture stops, and controls (adjusts) the light amounts.

The lens control units 204 and 304 control the zoom motors and the focus motors in accordance with zoom commands and focus commands from the camera body 1 via the lens communication units 205 and 305, respectively. The lens control unit 204 controls the aperture motor 105 in accordance with an aperture command from the camera body 1 via the lens communication unit 205.

The camera body 1 includes a first image sensor 12 that photoelectrically converts (images) an object image formed by a first optical system 201, and a second image sensor 13 that photoelectrically converts an object image formed by a second optical system 301. The first image sensor 12 and the second image sensor 13 are photoelectric conversion elements such as a CMOS sensor or a CCD sensor. The camera body 1 further includes a camera control unit (CAMERA CTRL) 14 configured to control the driving of the first image sensor 12 and the second image sensor 13, and to send various commands to the lens control units 204 and 304 via camera communication units (CAMERA COMMs) 15 and 16 and the lens communication units 205 and 305. The camera control unit 14 includes an unillustrated image processing unit configured to perform various processing for the imaging signal from each of the first image sensor 12 and the second image sensor 13 to generate first image data and second image data. An observer can observe a stereoscopic image in a case where the first image data and the second image data as a right-eye image and a left-eye image, respectively, are displayed on an observation apparatus such as a monitor or a head mount display. In this embodiment, the camera body 1 includes two image sensors 12 and 13 for two optical systems 201 and 301, but may obtain image signals to generate first and second image data from two areas on a single image sensor provided for two optical systems.

Figure 2:
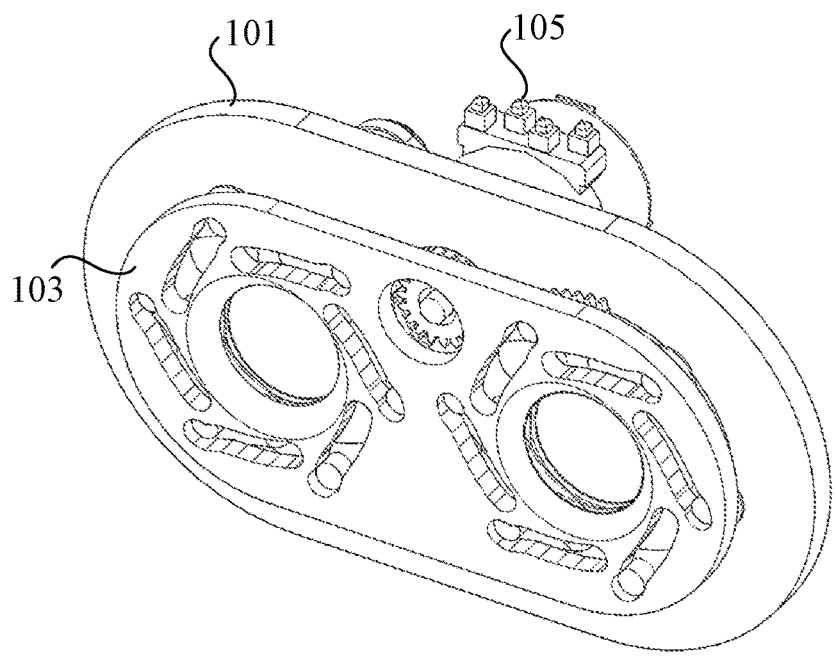
FIG. 2 is a perspective view illustrating an aperture stop apparatus according to Example 1.
Figure 3:
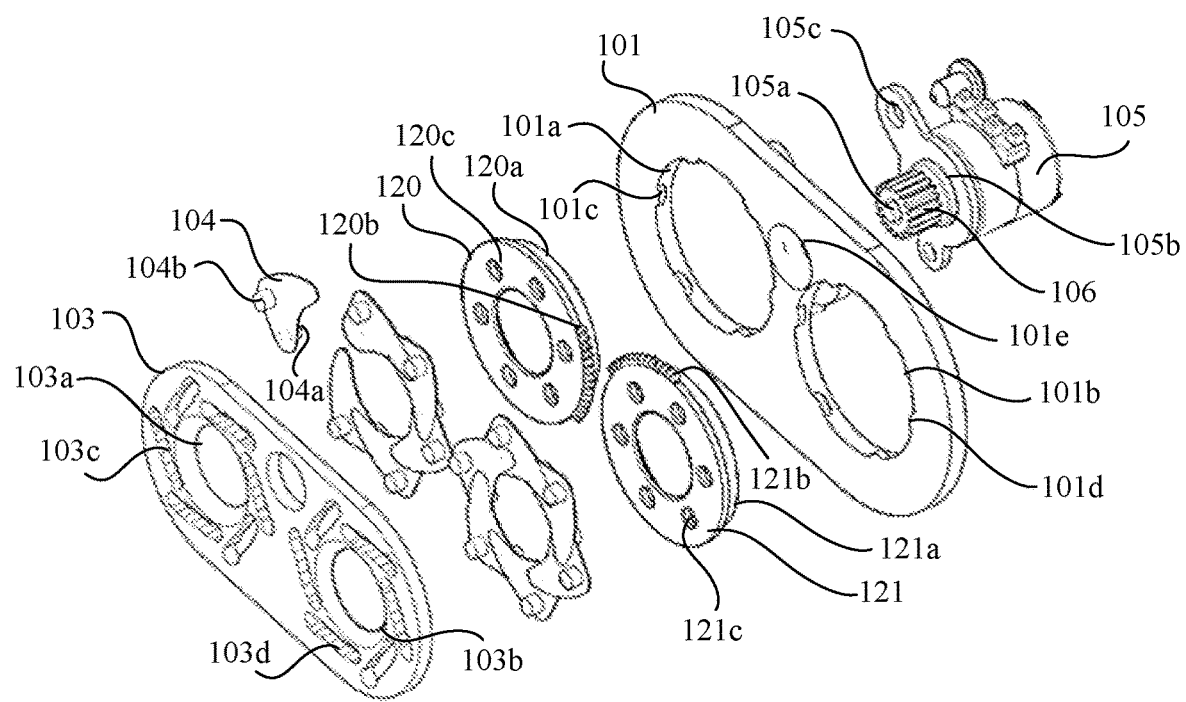
FIG. 3 is an exploded perspective view illustrating the configuration of the aperture stop apparatus according to Example 1.
Figure 4:
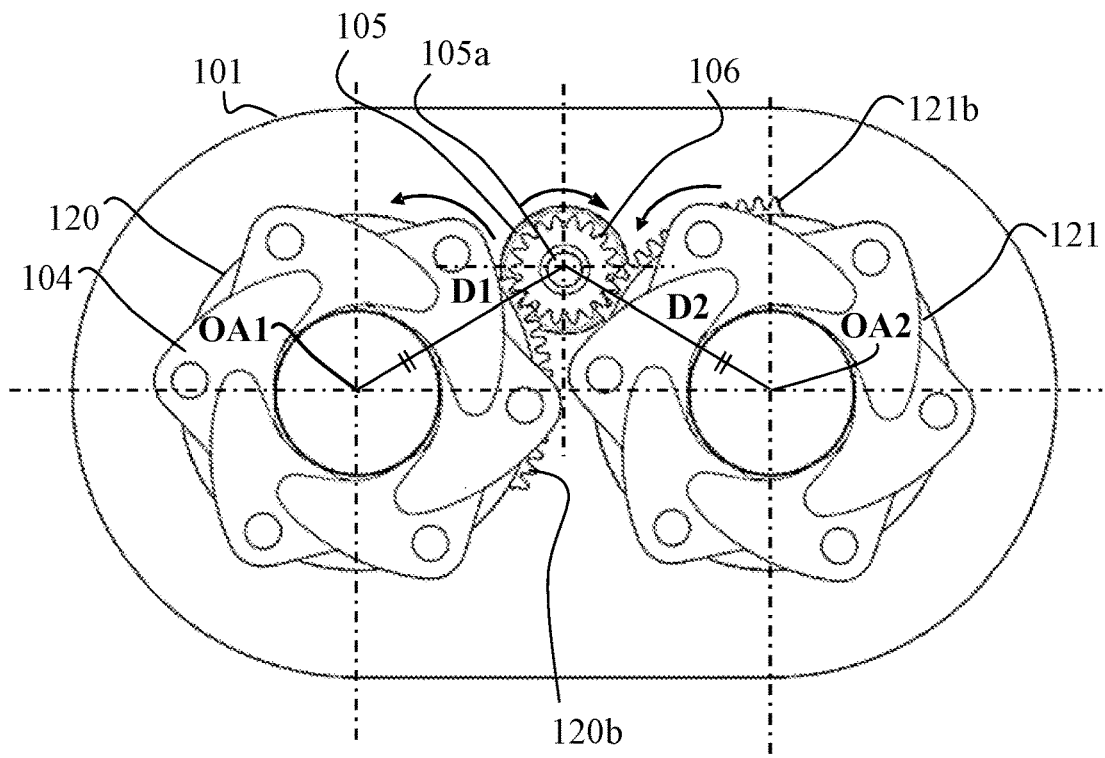
FIG. 4 explains the operation of the aperture stop apparatus according to Example 1.

FIGS. 2 and 3 illustrate the specific configuration of the light amount control apparatus 100. FIG. 4 also illustrates the operation of the light amount control apparatus 100. FIG. 4 illustrates the light amount control apparatus 100 when viewed from the optical axis direction (the direction in which the central axes of the first and second openings 101a and 101b extend) with a cam plate 103, which will be described below.

The light amount control apparatus 100 includes the first aperture stop including a plurality of (six in this example) blade members 104 for the first optical system 201, the second aperture stop including six blade members 104 for the second optical system 301, an unillustrated opening/closing mechanism configured to open or close the blade members 104. The opening/closing mechanism includes the aperture motor 105 as a driving source, an aperture base plate 101 as a base member, a first drive ring 120 as a first rotating member, a second drive ring 121 as a second rotating member, and a cam plate (cam member) 103 as a press member.

The aperture motor 105 is a stepping motor, and a pinion gear 106 as a drive gear is integrally rotatably fixed to a rotational drive shaft 105a of the aperture motor 105. The rotational drive shaft 105a is rotatably held by a bearing 105b. By fixing a fixed portion 105c of the aperture motor 105 onto the aperture base plate 101 with screws, the rotational drive shaft 105a is disposed at a predetermined position relative to the aperture base plate 101. The pinion gear 106 protrudes from a hole 101e formed in the aperture base plate 101 toward the first and second drive rings.

A first opening 101a corresponding to the first optical system 201 and a second opening 101b corresponding to the second optical system 301 are formed in the aperture base plate 101. Fitting receiving portions (engaged portions) 101c are formed at a plurality of locations in the circumferential direction on the inner circumference of the first opening 101a, and fitting portions (engaging portions) 120a provided on the outer circumference of the first drive ring 120 are engaged with the plurality of fitting receiving portions 101c. Thereby, the first drive ring 120 is rotatably held relative to the aperture base plate 101 around the center axis of the first opening 101a (that is, around the optical axis OA1 of the first optical system 201). Fitting receiving portions (engaged portions) 101d are formed at a plurality of locations in the circumferential direction on the inner circumference of the second opening 101b, and fitting portions (engaging portions) 121a provided on the outer circumference of the second drive ring 121 are engaged with the plurality of fitting receiving portions 101d. Thereby, the second drive ring 121 is rotatably held relative to the aperture base plate 101 around the center axis of the second opening 101b (that is, around the optical axis OA2 of the second optical system 301).

Gear portions 120b and 121b are formed on parts of the outer circumferences of the first drive ring 120 and the second drive ring 121, and the pinion gear 106 is engaged with these gear portions 120b and 121b. Therefore, as illustrated in FIG. 4, as the aperture motor 105 is driven and the pinion gear 106 rotates, the first drive ring 120 and the second drive ring 121 rotate in the same direction relative to the aperture base plate 101. In FIG. 4, pinion gear 106 rotates clockwise, and first drive ring 120 and the second drive ring 121 rotate counterclockwise.

The first aperture stop is an iris stop that forms an aperture corresponding to the first optical system 201 in which six blade members 104 are arranged at equal intervals in the circumferential direction of the first drive ring 120 so that they partially overlap each other in the optical axis direction. Six rotation holes 120c are formed in the first drive ring 120 at equal intervals in the circumferential direction. Rotation pins 104a of the six blade members 104 are rotatably fitted into corresponding rotation holes 120c in the first drive ring 120. The second aperture is an iris stop that forms an aperture corresponding to the second optical system 301 in which six blade members 104 are arranged at equal intervals in the circumferential direction of the second drive ring 121 so that they partially overlap each other in the optical axis direction. Six rotation holes 121c are formed in the second drive ring 121 at equal intervals in the circumferential direction. Rotation pins 104a of the six blade members 104 are rotatably fitted into corresponding rotation holes 121c in the second drive ring 121.

The first aperture stop and the second aperture stop are not limited to those having six blade members, but may be any iris stops as long as they have three or more blade members.

The cam plate 103 is disposed so as to sandwich the first drive ring 120, the second drive ring 121, and the twelve blade members 104 between the cam plate 103 and the aperture base plate 101, and is fixed onto the aperture base plate 101 with screws. A first opening 103a corresponding to the first optical system 201 and a second opening 103*b* corresponding to the second optical system 301 are formed in the cam plate 103. Six cam grooves 103*c* are formed at equal intervals in the circumferential direction around the first opening 103*a* in the cam plate 103, and six cam grooves 103*d* are formed at equal intervals in the circumferential direction around the second opening 103*b* in the cam plate 103. In the first aperture stop, the cam pins 104*b* of the six blade members 104 are respectively engaged with the corresponding cam grooves 103*c*. In the second aperture stop, the cam pins 104*b* of the six blade members 104 are respectively engaged with the corresponding cam grooves 103*d*.

Due to the above configuration, as each drive ring (120, 121) rotates, the rotation pins 104*a* of each blade member 104 move in the circumferential direction together with each drive ring. At the same time, the cam pins 104*b* of each blade member 104 move along each cam groove (103*b*, 103*d*) in the cam plate 103, so that each blade member 104 rotates (swivels) in the opening/closing direction around the rotation pins 104*a*. Thereby, the aperture diameter (aperture value or F-number) formed by the six blade members 104 in each of the first and second apertures changes. The lens control unit 204 controls the driving direction of the aperture motor 105 (that is, the aperture value changing direction) by changing the polarity of a driving pulse signal applied to the aperture motor 105, and controls the driving position (that is, the aperture value) of the aperture motor 105 by counting the number of pulses of the driving pulse signal. A sensor may be provided to detect that each aperture stop is at its minimum F-number (maximum aperture state).

In driving a blade member through an arm or lever as in the aperture stop apparatuses disclosed Japanese Patent Laid-Open Nos. 2014-119615 and 2021-056394, a rotating amount of the arm or lever is generally limited to about 30° to 40°, and thus fine control of the aperture diameter is difficult. On the other hand, in a case where the blade members are driven through a gear as in this embodiment, the rotating amount of the gear can be set to 60° or more (or even 360° or more), and thus fine control of the aperture diameter is available.

In each of the first and second aperture stops, the overlap amount between the six blade members 104 changes according to the rotational positions of the six blade members 104, and thereby the load of the aperture motor 105 changes. More specifically, as the overlap amount between the blade members 104 increases, the load of the aperture motor 105 increases. The lens control unit 204 controls the output torque of the aperture motor 105 by changing the pulse frequency of the driving pulse signal applied to the aperture motor 105.

In this embodiment, the aperture motor 105 is held at a portion between the first opening 101*a* and the second opening 101*b* in the aperture base plate 101 when viewed in the optical axis direction illustrated in FIG. 4. Thereby, the aperture motor 105 can be held so as not to protrude significantly upward from the first and second aperture stops, and an increase in the height of the light amount control apparatus 100 can be suppressed.

Now assume that D1 and D2 are distances from a rotation center axis of the aperture motor 105 (center axis of the rotational drive shaft 105*a*) when viewed from the optical direction illustrated in FIG. 4 to respective centers of the first opening 101*a* and the second opening 101*b* of the aperture base plate 101 (the positions of the optical axes OA1 and OA2). The aperture motor 105 is held at a position where the distances D1 and D2 are equal to each other. However, the distances D1 and D2 do not have to be exactly the same, and one may have a difference of 10% or less from the other. That is, it is sufficient that the ratio (D1/D2) between the distance D1 and the distance D2 is 0.9 or more and 1.1 or less.

Disposing the aperture motor 105 in this manner enables the pinion gear 106 to be engaged with the gear portions 120*b* and 121*b* of the first and second drive rings 120 and 121 at the same reduction ratios. Thereby, driving the single aperture motor 105 can control the first and second drive rings 120 and 121 so that the rotation directions and rotation amounts of the first and second drive rings 120 and 121 are the same (or can be considered to be the same). As a result, the first aperture stop and the second aperture stop can be set to the same aperture values (or aperture values that can be considered to be the same), and the luminances of the first and second optical systems 201 and 301 can be equal to each other. In addition, using the first drive ring 120 and the second drive ring 121 having the same structures can suppress a difference in aperture value between the first and second aperture stops that may occur due to variations in manufacturing errors in a case where they have different structures.

This embodiment can create a nearly circular aperture shape using the six blade members 104, which can cope with an aperture value from a maximum aperture to a small aperture that causes an image degradation shape. Therefore, an excellent image degradation shape can be obtained in imaging.

This embodiment forms the rotation holes 120*c* and 121*c* into which the rotation pins 104*a* of the blade members 104 are inserted, in the first and second drive rings (rotating members) 120 and 121, and the cam grooves 103*c* and 103*d* to be engaged with the cam pins 104*b*, in the cam plate (press member) 103. Alternatively, the rotating member may have cam grooves with which the cam pins of the blade member are engaged, and the press member may have rotation holes into which the rotation pins of the blade member are inserted. The rotation holes into which the rotation pins of the blade member are inserted may be formed in the aperture base plate (base member), and the cam grooves with which the cam pins of the blade member are engaged may be formed in the rotating members.

Example 2

Figure 5:
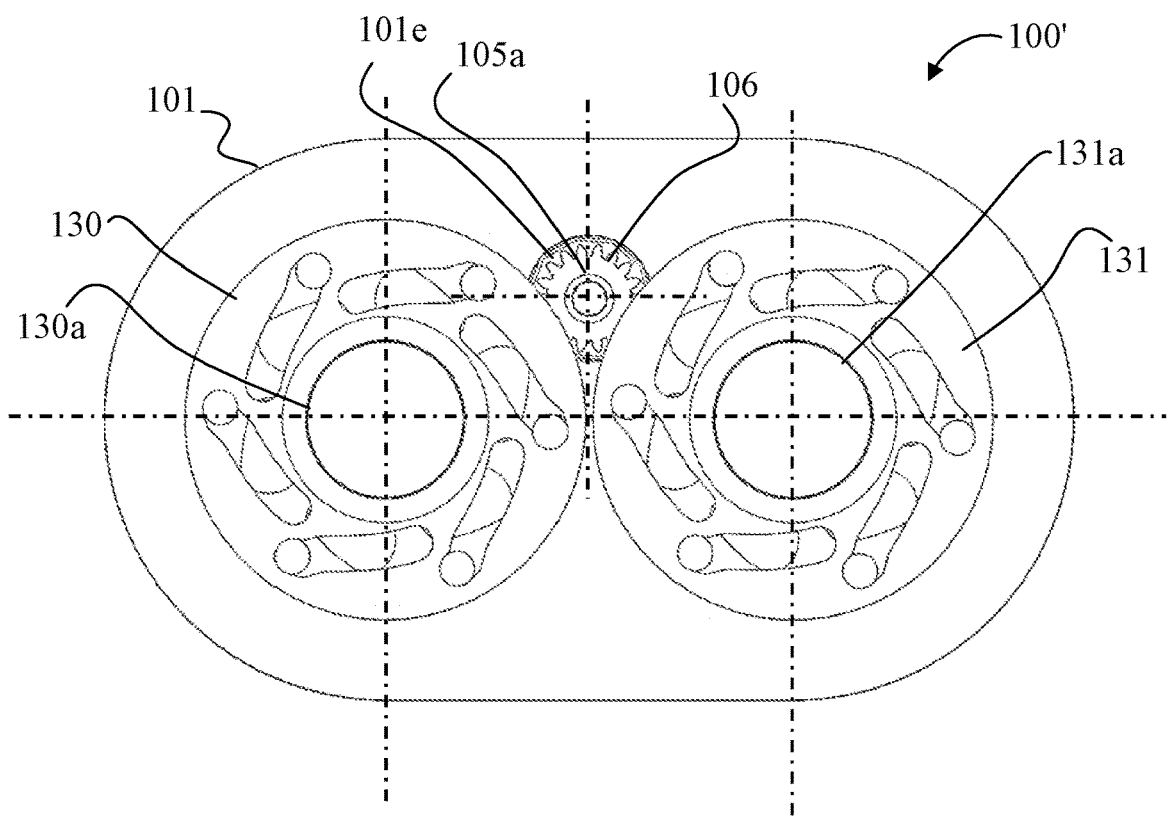
FIG. 5 illustrates the configuration of an aperture stop apparatus according to Example 2.
Figure 6:
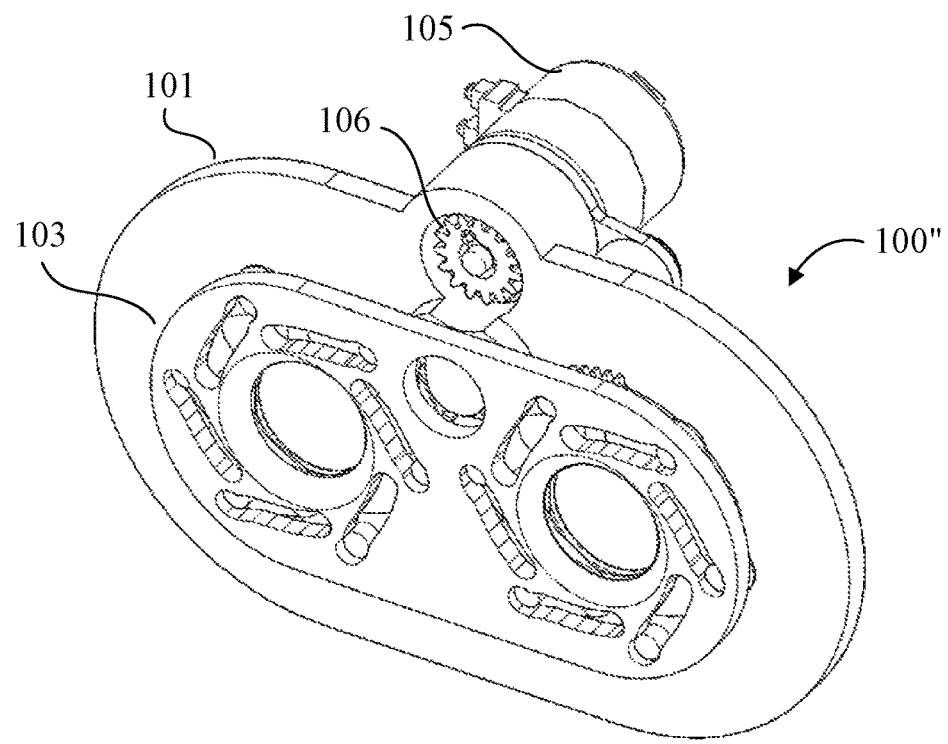
FIG. 6 is a front perspective view illustrating an aperture stop apparatus according to Example 3.
Figure 7:
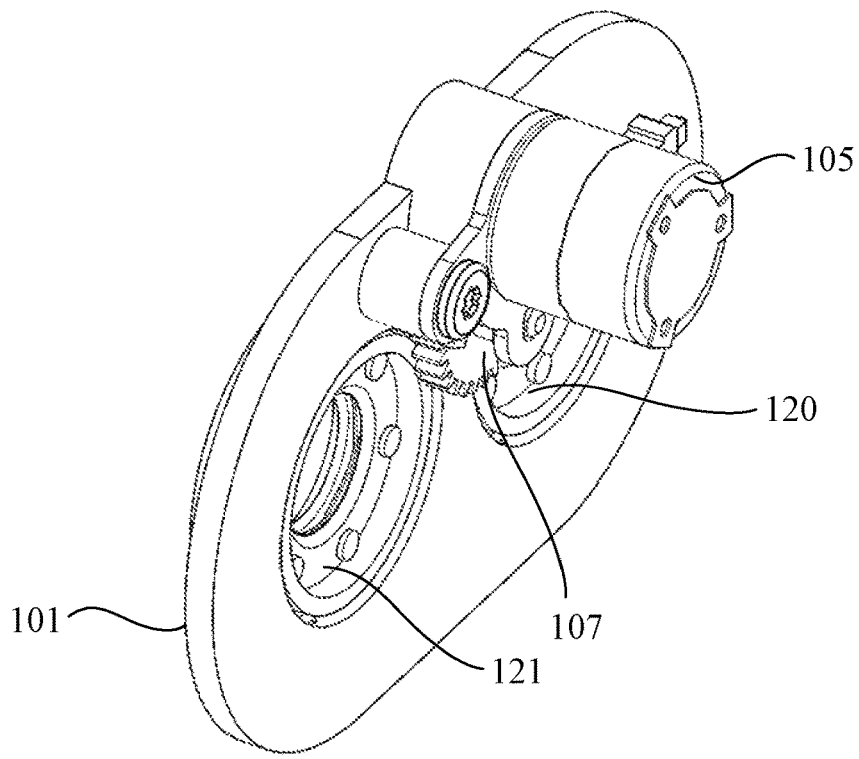
FIG. 7 is a rear perspective view illustrating the aperture stop apparatus according to Example 3.

FIG. 5 illustrates an aperture stop apparatus 100' according to Example 2. In this embodiment, a first cam plate (first cam member) 130 has a first opening 130*a* corresponding to the first optical system 201, and a second cam plate (second cam member) 131 has a second opening 131*a* corresponding to the second optical system 301. The first cam plate 130 and the second cam plate 131 have the same structures.

Using the same structures of the first and second cam plates 130 and 131 can suppress a difference in the aperture value between the first and second aperture stops due to variations in manufacturing errors in the cam grooves of the first and second cam plates 130 and 131, respectively.

Example 3

Figure 10:
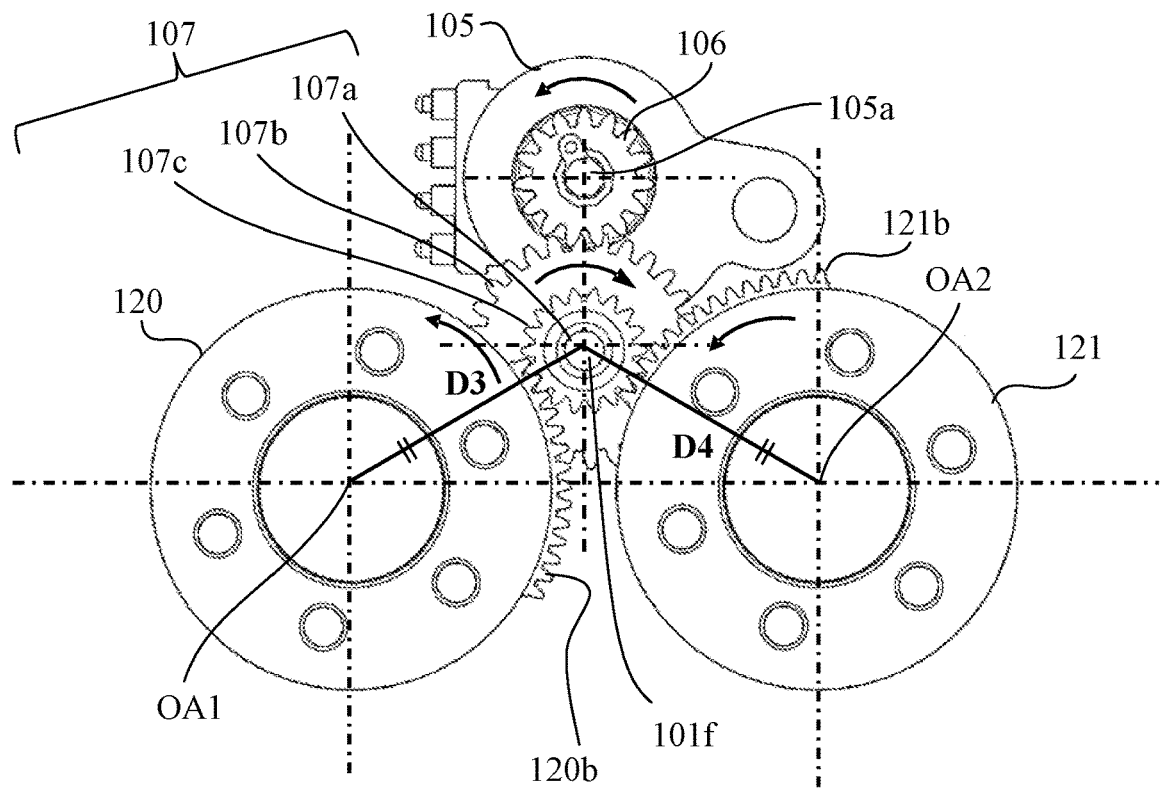
FIG. 10 explains the operation of the aperture stop apparatus according to Example 3.

FIGS. 6, 7, 8, and 9 illustrate the specific configuration of the light amount control apparatus 100" according to Example 3. FIG. 10 illustrates the operation of the light amount control apparatus 100". FIG. 10 illustrates the light amount control apparatus 100" when viewed from the optical axis direction (the direction in which the central axes of the first and second openings 101*a* and 101*b* extend) in a case where a cam plate 103, which will be described below, is removed.

The light amount control apparatus 100″ includes a first aperture stop including a plurality of (six in this embodiment) blade members 104 for the first optical system 201, and a second aperture stop including six blade members 104 for the second optical system 301, and an unillustrated opening/closing mechanism configured to open or close the blade members 104. The opening/closing mechanism includes an aperture motor 105 as a driving source, an aperture base plate 101 as a base member, a two-stage gear 107 as a relay gear, a first drive ring 120 as a first rotating member, a second drive ring 121 as a second rotating member, and a cam plate (cam member) 103 as a press member.

The aperture motor 105 is a stepping motor, and a pinion gear 106 as a drive gear is integrally rotatably fixed to a rotational drive shaft 105*a* of the aperture motor 105. The rotational drive shaft 105*a* is rotatably held by a bearing 105*b*. By fixing the fixed portion 105*c* of the aperture motor 105 onto the aperture base plate 101 with screws, the rotational drive shaft 105*a* is disposed at a predetermined position relative to the aperture base plate 101. The pinion gear 106 protrudes from a hole 101*e* formed in the aperture base plate 101 toward the first and second drive rings.

A first opening 101*a* corresponding to the first optical system 201 and a second opening 101*b* corresponding to the second optical system 301 are formed in the aperture base plate 101. Fitting receiving portions (engaged portions) 101*c* are formed at a plurality of locations in the circumferential direction on the inner circumference of the first opening 101*a*, and fitting portions (engaging portions) 120*a* provided on the outer circumference of the first drive ring 120 are engaged with the plurality of fitting receiving portions 101*c*. Thereby, the first drive ring 120 is rotatably held relative to the aperture base plate 101 around the center axis of the first opening 101*a* (that is, around the optical axis OA1 of the first optical system 201). Fitting receiving portions (engaged portions) 101*d* are formed at a plurality of locations in the circumferential direction on the inner circumference of the second opening 101*b*, and fitting portions (engaging portions) 121*a* provided on the outer circumference of the second drive ring 121 are engaged with the plurality of fitting receiving portions 101*d*. Thereby, the second drive ring 121 is rotatably held relative to the aperture base plate 101 around the center axis of the second opening 101*b* (that is, around the optical axis OA2 of the second optical system 301).

The two-stage gear 107 has a first gear portion 107*b* and a second gear portion 107*c* which is formed coaxially with the first gear portion 107*b* and has a smaller diameter and fewer cogs than those of the first gear portion 107*b*. A hole 107*a* is formed in the center of the two-stage gear 107, and a support shaft portion 101*f* provided on the aperture base plate 101 is inserted into the hole 107*a*. Thereby, the two-stage gear 107 is rotatably held by the aperture base plate 101. The pinion gear 106 is engaged with the first gear portion 107*b*.

Gear portions 120*b* and 121*b* are formed on parts of the outer circumferences of the first drive ring 120 and the second drive ring 121, and the second gear portion 107*c* of the two-stage gear 107 is engaged with these gear portions 120*b* and 121*b*. Therefore, as illustrated in FIG. 10, as the aperture motor 105 is driven and the pinion gear 106 rotates, the first drive ring 120 and the second drive ring 121 rotates in the same direction relative to the aperture base plate 101 via the two-stage gear 107. In FIG. 10, pinion gear 106 rotates counterclockwise, the two-stage gear 107 rotates clockwise, and the first drive ring 120 and the second drive ring 121 rotate counterclockwise.

This embodiment transmits rotation from the pinion gear (drive gear) 106 to the first and second drive rings 120 and 121 via the single two-stage gear (relay gear) 107. Another embodiment may engage two relay gears with the drive gear, and transmit rotation to the first drive ring 120 through one of the two relay gears, and rotation to the second drive ring 121 through the other of the two relay gears. An idler gear may be disposed between the drive gear and the relay gear.

The first aperture stop is an iris stop that forms an aperture corresponding to the first optical system 201 in which six blade members 104 are arranged at equal intervals in the circumferential direction of the first drive ring 120 so that they partially overlap each other in the optical axis direction. Six rotation holes 120*c* are formed in the first drive ring 120 at equal intervals in the circumferential direction. Rotation pins 104*a* of the six blade members 104 are rotatably fitted into corresponding rotation holes 120*c* in the first drive ring 120. The second aperture is an iris stop that forms an aperture corresponding to the second optical system 301 in which six blade members 104 are arranged at equal intervals in the circumferential direction of the second drive ring 121 so that they partially overlap each other in the optical axis direction. Six rotation holes 121*c* are formed in the second drive ring 121 at equal intervals in the circumferential direction. Rotation pins 104*a* of the six blade members 104 are rotatably fitted into corresponding rotation holes 121*c* in the second drive ring 121.

The first aperture stop and the second aperture stop are not limited to those having six blade members, but may be any iris stop as long as they have three or more blade members.

The cam plate 103 is disposed so as to sandwich the first drive ring 120, the second drive ring 121, and the twelve blade members 104 between the cam plate 103 and the aperture base plate 101, and is fixed to the aperture base plate 101 with screws. A first opening 103*a* corresponding to the first optical system 201 and a second opening 103*b* corresponding to the second optical system 301 are formed in the cam plate 103. Six cam grooves 103*c* are formed at equal intervals in the circumferential direction around the first opening 103*a* in the cam plate 103, and six cam grooves 103*d* are formed at equal intervals in the circumferential direction around the second opening 103*b* in the cam plate 103. In the first aperture stop, the cam pins 104*b* of the six blade members 104 are respectively engaged with the corresponding cam grooves 103*c*. In the second aperture stop, the cam pins 104*b* of the six blade members 104 are respectively engaged with the corresponding cam grooves 103*d*.

Due to the above configuration, as each drive ring (120, 121) rotates, the rotation pins 104*a* of each blade member 104 move in the circumferential direction together with each drive ring. At the same time, the cam pins 104*b* of each blade member 104 move along each cam groove (103*b*, 103*d*) in the cam plate 103, so that each blade member 104 rotates (swivels) in the opening/closing direction around the rotation pins 104*a*. Thereby, the aperture diameter (aperture value) formed by the six blade members 104 in each of the first and second apertures changes. The lens control unit 204 controls the driving direction of the aperture motor 105 (that is, the aperture value changing direction) by changing the polarity of a driving pulse signal applied to the aperture motor 105, and controls the driving position (that is, the aperture value) of the aperture motor 105 by counting the number of pulses of the driving pulse signal. A sensor may be provided to detect that each aperture is at its minimum F-number (maximum aperture state).

In driving a blade member through an arm or lever as in the aperture stop apparatuses disclosed Japanese Patent Laid-Open Nos. 2014-119615 and 2021-056394, a rotating amount of the arm or lever is generally limited to about 30° to 40°, and thus fine control of the aperture diameter is difficult. On the other hand, in a case where the blade members are driven through a gear as in this embodiment, the rotating amount of the gear can be set to 60° or more (or even 360° or more), and thus fine control of the aperture diameter is available.

In each of the first and second aperture stops, the overlap amount between the six blade members 104 changes according to the rotational positions of the six blade members 104, and thereby the load of the aperture motor 105 changes. More specifically, as the overlap amount between the blade members 104 increases, the load of the aperture motor 105 increases. The lens control unit 204 controls the output torque of the aperture motor 105 by changing the pulse frequency of the driving pulse signal applied to the aperture motor 105.

In this embodiment, the two-stage gear 107 is held at a portion between the first opening 101a and the second opening 101b in the aperture base plate 101 when viewed in the optical axis direction illustrated in FIG. 10. Thereby, the two-stage gear 107 can be held so as not to protrude significantly upward from the first and second apertures (first and second drive rings 120 and 121), and an increase in the height of the light amount control apparatus 100" can be suppressed.

Now assume that D3 and D4 are distances from a rotation center axis of the two-stage gear 107 (center of the support shaft 101f) when viewed from the optical direction illustrated in FIG. 10 to respective centers of the first opening 101a and the second opening 101b of the aperture base plate 101 (the positions of the optical axes OA1 and OA2). The two-stage gear 107 is held at a position where the distances D3 and D4 are equal to each other. However, the distances D3 and D4 do not have to be exactly the same, and one may have a difference of 10% or less from the other. That is, it is sufficient that the ratio (D3/D4) between the distance D3 and the distance D4 is 0.9 or more and 1.1 or less.

Disposing the two-stage gear 107 in this manner enables the first gear portion 107b to be engaged with the gear portions 120b and 121b of the first and second drive rings 120 and 121 at the same reduction ratio. Thereby, driving the single aperture motor 105 can control the first and second drive rings 120 and 121 so that the rotation directions and rotation amounts of the first and second drive rings 120 and 121 are the same (or can be considered to be the same). As a result, the first aperture stop and the second aperture stop can be set to the same aperture values (or aperture values that can be considered to be the same), and the luminances of the first and second optical systems 201 and 301 can be equal to each other.

The upper limit of the number of cogs of the gear portions 120b and 121b provided on the first and second drive rings 120 and 121 cannot be set larger than the distance between the rotation center axes of the first and second drive rings 120 and 121. On the other hand, since the pinion gear 106 is fixed onto the outer circumference of the rotational drive shaft 105a of the aperture motor 105, the lower limit of the number of cogs cannot be sufficiently reduced. Therefore, unless the two-stage gear 107 is provided, the reduction ratio from the pinion gear 106 to the first and second drive rings 120 and 121 cannot be set to a large value.

For fine control of the light amount, the rotating amounts of the first and second drive rings 120 and 121 are to be reduced relative to the rotating amount of the aperture motor 105 to lower the light amount control sensitivity. By providing the two-stage gear 107 between the pinion gear 106 and the first and second drive rings 120 and 121 as in this embodiment, the reduction ratio from the pinion gear 106 to the first and second drive rings 120 and 121 can be set to a large value. As a result, the ratio of the rotating amounts of the first and second drive rings 120 and 121 to the rotating amount of the aperture motor 105 can be reduced, and fine control of the light amount can be achieved.

Figure 8:
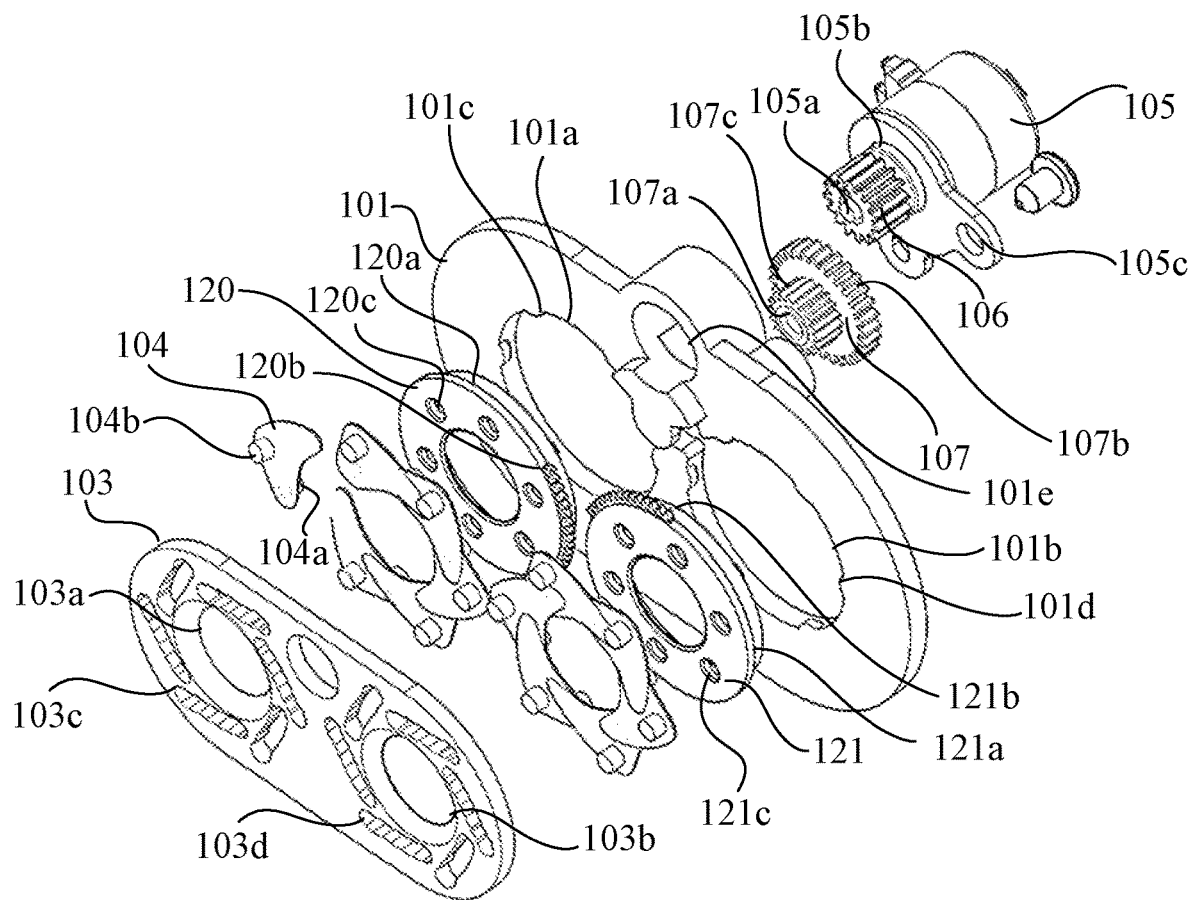
FIG. 8 is an exploded front perspective view illustrating the configuration of the aperture stop apparatus according to Example 3.
Figure 9:
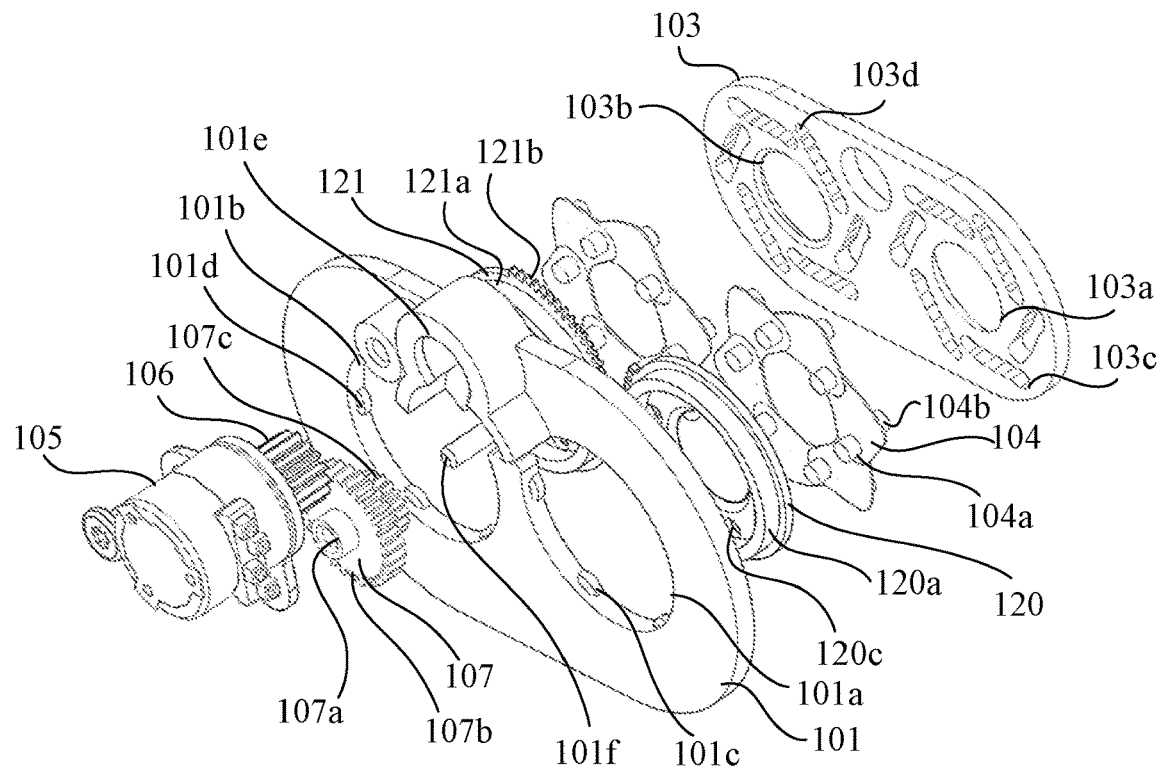
FIG. 9 is an exploded rear perspective view illustrating the configuration of the aperture stop apparatus according to Example 3.

The two-stage gear 107 increases the degree of freedom in placing the aperture motor 105 when viewed in the optical axis direction. That is, instead of disposing the aperture motor 105 directly above the two-stage gear 107 as illustrated in FIG. 8, the two-stage gear 107 can be disposed diagonally above or the like. This configuration can change the external shape of the light amount control apparatus 100" according to the space in which the light amount control apparatus 100" is disposed within the stereo optical unit 20.

Using the first drive ring 120 and the second drive ring 121 having the same structures can suppress a difference in aperture value between the first and second aperture stops that may occur due to variations in manufacturing errors in a case where they have different structures.

This embodiment can create a polygonal aperture shape close to a circular aperture shape using the six blade members 104, which can cope with an aperture value from a maximum aperture to a small aperture that causes an image degradation shape. Therefore, an excellent image degradation shape can be obtained in imaging.

This embodiment forms the rotation holes 120c and 121c into which the rotation pins 104a of the blade members 104 are inserted, in the first and second drive rings (rotating members) 120 and 121, and the cam grooves 103c and 103d to be engaged with the cam pins 104b in the cam plate (press member) 103. Alternatively, the rotating member may have cam grooves with which the cam pins of the blade member are engaged, and the press member may have rotation holes into which the rotation pins of the blade member are inserted. The rotation holes into which the rotation pins of the blade member are inserted may be formed in the aperture base plate (base member), and the cam grooves with which the cam pins of the blade member are engaged may be formed in the rotating members.

Instead of the cam plate in this embodiment, a first cam plate (first cam member) having a first opening corresponding to the first optical system 201 and a second cam plate (second cam member) having a second opening corresponding to the second optical system 301 may be provided. In this case, the first cam plate and the second cam plate may have the same structures. Thereby, a difference in aperture value can be suppressed between the first and second aperture stops due to variations in manufacturing errors of the cam groove portions in the first and second cam plates, respectively.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide an aperture stop apparatus configured to control a light amount while obtaining an excellent image degradation shape with a single driving source for two optical systems.

This application claims priority to Japanese Patent Application Nos. 2023-067284 and 2023-067269, which were filed on Apr. 17, 2023, and which are hereby incorporated by reference herein in their entirety.

What is claimed is:

1. An aperture stop apparatus configured to control a light amount in each of a first optical system and a second optical system arranged in parallel, the aperture stop apparatus comprising:
a drive gear;
a single driving source configured to drive the drive gear;
a base member configured to hold the driving source and having a first opening corresponding to the first optical system and a second opening corresponding to the second optical system;
a first aperture stop configured to form an aperture for light passing through the first opening;
a second aperture stop configured to form an aperture for light passing through the second opening;
a first rotating member rotatable around a center axis of the first opening relative to the base member and including a gear portion; and
a second rotating member rotatable around a center axis of the second opening relative to the base member and including a gear portion,
wherein each of the first aperture stop and the second aperture stop is an iris stop having three or more blade members,
wherein the first aperture stop is operated as the first rotating member rotates and the second aperture stop is operated as the second rotating member rotates, and
wherein a rotation of the drive gear driven by the driving source is transmitted to the first rotating member and the second rotating member through the gear portions engaged with the drive gear.

2. The aperture stop apparatus according to claim 1, wherein part of the driving source is held between the first opening and the second opening on the base member when viewed from a direction in which each center axis extends.

3. The aperture stop apparatus according to claim 1, wherein when viewed from a direction in which each center axis extends, the driving source is held by the base member at a position where a ratio between a distance from a rotation center axis of the driving source to the center axis of the first opening and a distance from the rotation center axis to the center axis of the second opening is 0.9 or more and 1.1 or less.

4. The aperture stop apparatus according to claim 1, wherein the rotation of the driving source causes the first rotating member and the second rotating member to rotate in same directions.

5. The aperture stop apparatus according to claim 1, wherein a reduction ratio from the drive gear to the gear portion for the first rotating member and a reduction ratio from the drive gear to the gear portion for the second rotating member are equal.

6. The aperture stop apparatus according to claim 1, wherein the first rotating member and the second rotating member have the same structures.

7. The aperture stop apparatus according to claim 1, further comprising a cam member including a cam configured to rotate the blade members in the first aperture stop and the second aperture stop in an opening or closing direction in accordance with rotations of the first rotating member and the second rotating member.

8. The aperture stop apparatus according to claim 7, wherein the cam member includes a first cam member including the cam configured to rotate the blade members for the first aperture stop, and a second cam member including the cam configured to rotate the blade members for the second aperture stop, and wherein the first cam member and the second cam member have the same structures.

9. The aperture stop apparatus according to claim 1, wherein each of the first rotating member and the second rotating member includes a cam configurated to rotate the blade members in a corresponding one of the first aperture stop and the second aperture stop in an opening or closing direction in accordance with a corresponding one of rotations of the first rotating member and the second rotating member.

10. The aperture stop apparatus according to claim 1, further comprising a relay gear engaged with the drive gear and the gear portions, wherein the rotation of the drive gear driven by the driving source is transmitted to the first rotating member and the second rotating member through the relay gear and the gear portions.

11. The aperture stop apparatus according to claim 10, wherein part of the relay gear is held between the first opening and the second opening in the base member when viewed from a direction in which each center axis extends.

12. The aperture stop apparatus according to claim 10, wherein when viewed from a direction in which each center axis extends, the relay gear is held by the base member at a position where a ratio between a distance from a rotation center axis of the relay gear to the center axis of the first opening and a distance from the rotation center axis to the center axis of the second opening is 0.9 or more and 1.1 or less.

13. The aperture stop apparatus according to claim 10, wherein the rotation of the driving source causes the first rotating member and the second rotating member to rotate in the same directions.

14. The aperture stop apparatus according to claim 10, wherein a reduction ratio from the drive gear to the gear portion for the first rotating member via the relay gear and a reduction ratio from the drive gear to the gear portion for the second rotating member via the relay gear are equal.

15. The aperture stop apparatus according to claim 10, wherein the first rotating member and the second rotating member have the same structures.

16. The aperture stop apparatus according to claim 10, further comprising a cam member including a cam configured to rotate the blade members in the first aperture stop and the second aperture stop in an opening or closing direction in accordance with rotations of the first and second rotating members.

17. The aperture stop apparatus according to claim 16, wherein the cam member includes a first cam member including the cam configured to rotate the blade members for the first aperture stop, and a second cam member including the cam configured to rotate the blade members for the second aperture stop, and wherein the first cam member and the second cam member have the same structures.

18. The aperture stop apparatus according to claim 10, wherein each of the first rotating member and the second rotating member includes a cam configurated to rotate the blade members in a corresponding one of the first aperture stop and the second aperture stop in an opening or closing direction in accordance with a corresponding one of rotations of the first rotating member and the second rotating member.

19. An optical apparatus comprising:
a first optical system; and
a second optical system arranged in parallel to the first optical system; and
an aperture stop apparatus configured to control a light amount in each of the first optical system and the second optical system,
wherein the aperture stop apparatus includes:
a drive gear;
a single driving source configured to drive the drive gear;
a base member configured to hold the driving source and having a first opening corresponding to the first optical system and a second opening corresponding to the second optical system;
a first aperture stop configured to form an aperture for light passing through the first opening;
a second aperture stop configured to form an aperture for light passing through the second opening;
a first rotating member rotatable around a center axis of the first opening relative to the base member and including a gear portion; and
a second rotating member rotatable around a center axis of the second opening relative to the base member and including a gear portion,
wherein each of the first aperture stop and the second aperture stop is an iris stop having three or more blade members,
wherein the first aperture stop is operated as the first rotating member rotates and the second aperture stop is operated as the second rotating member rotates, and
wherein a rotation of the drive gear driven by the driving source is transmitted to the first rotating member and the second rotating member through the gear portions engaged with the drive gear.

* * * * *